(12) United States Patent
Théberge et al.

(10) Patent No.: US 9,575,309 B2
(45) Date of Patent: Feb. 21, 2017

(54) TELESCOPIC CONTROL OF HIGH POWER LASER PROPAGATION

(75) Inventors: Francis Théberge, Shannon (CA); Jacques Dubois, Quebec (CA); Marc Châteauneuf, Saint-Augustin-de-Desmaures (CA)

(73) Assignee: HER MAJESTY THE QUEEN IN RIGHT OF CANADA, AS REPRESENTED BY THE MINISTER OF NATIONAL DEFENCE, Ottawa, Ontario (CA)

( * ) Notice: Subject to any disclaimer, the term of this patent is extended or adjusted under 35 U.S.C. 154(b) by 6 days.

(21) Appl. No.: 14/424,488

(22) PCT Filed: Sep. 10, 2012

(86) PCT No.: PCT/CA2012/050626
§ 371 (c)(1),
(2), (4) Date: Jul. 14, 2015

(87) PCT Pub. No.: WO2014/036628
PCT Pub. Date: Mar. 13, 2014

(65) Prior Publication Data
US 2016/0025960 A1    Jan. 28, 2016

(51) Int. Cl.
*G02B 23/02*    (2006.01)
*G01S 17/88*    (2006.01)
(Continued)

(52) U.S. Cl.
CPC ............... *G02B 23/02* (2013.01); *G01S 17/88* (2013.01); *G02B 17/0621* (2013.01);
(Continued)

(58) Field of Classification Search
CPC . G02B 23/02; G02B 17/0621; G02B 17/0694; G02B 19/0023; G02B 23/06; G02B 26/06; G02B 19/0047; G02B 27/108; G01S 17/88; G01S 7/4815; H02J 17/00
(Continued)

(56) References Cited

U.S. PATENT DOCUMENTS 7,391,557 B1 *  6/2008  Bruch ....................... G01J 3/10
                                                            356/450
8,076,624 B1   12/2011  Barchers
(Continued)

FOREIGN PATENT DOCUMENTS

KR          100763974 B1 * 10/2007

OTHER PUBLICATIONS

Huai Liang Xu et al., "Femtosecond Laser Filamentation for Atmospheric Sensing", SENSORS 2011, 11, pp. 32-53, 23 Dec. 2010, http://www.mdpi.com/journal/sensors (ISSN 1424-8220).*
(Continued)

*Primary Examiner* — Frank Font
(74) *Attorney, Agent, or Firm* — Brion Raffoul

(57) ABSTRACT

The present invention provides a reflective telescopic system, to control the generation of filamentation of ultrashort and intense laser pulses that includes: a flat mirror, an adaptive reflective mirror, a dichroic convex mirror, an off-axis parabolic mirror, and a first laser source. The convex mirror and the adaptive reflective mirror are mounted on an independent breadboard and set on a translation stage. The propagation axis of the laser beam reflected by the mirror should correspond to the off-axis of the parabolic mirror. The parabolic mirror reflects the beam at a specific angle. Finally, the propagation axis between the dichroic convex mirror and the off-axis parabolic mirror, the propagation axis between the flat mirror and the adaptive reflective mirror, and the axis of the translation stage should be substantially parallel to each other. The present invention also contem-
(Continued)

plates the boresighting of a weak laser beam from a second laser source.

10 Claims, 2 Drawing Sheets

(51) Int. Cl.
    *H02J 17/00*     (2006.01)
    *G02B 23/06*     (2006.01)
    *G02B 17/06*     (2006.01)
    *G02B 26/06*     (2006.01)
    *G02B 19/00*     (2006.01)
    *G01S 7/481*     (2006.01)
    *G02B 27/10*     (2006.01)

(52) U.S. Cl.
    CPC ..... *G02B 17/0694* (2013.01); *G02B 19/0023* (2013.01); *G02B 23/06* (2013.01); *G02B 26/06* (2013.01); *H02J 17/00* (2013.01); *G01S 7/4815* (2013.01); *G02B 19/0047* (2013.01); *G02B 27/108* (2013.01)

(58) Field of Classification Search
    USPC .................. 359/365, 366, 399; 356/337, 342
    See application file for complete search history.

(56) References Cited

U.S. PATENT DOCUMENTS

| | | | | |
|---|---|---|---|---|
| 8,103,045 B2 * | 1/2012 | McGraw | ................ | G01W 1/02 |
| | | | | 250/201.9 |
| 8,300,669 B2 * | 10/2012 | Dantus | ................... | G01J 11/00 |
| | | | | 250/458.1 |
| 8,319,435 B1 * | 11/2012 | Wood | ...................... | H05H 1/48 |
| | | | | 315/111.21 |
| 8,511,842 B1 * | 8/2013 | Sacco | ...................... | G02B 5/08 |
| | | | | 359/846 |
| 8,633,437 B2 * | 1/2014 | Dantus | ................... | G01N 21/65 |
| | | | | 250/281 |
| 2002/0091441 A1 * | 7/2002 | Guzik | ................... | A61F 2/2415 |
| | | | | 623/2.13 |
| 2008/0021329 A1 * | 1/2008 | Wood | .................... | A61B 5/0059 |
| | | | | 600/476 |
| 2008/0225383 A1 | 9/2008 | Theberge et al. | | |
| 2009/0180114 A1 * | 7/2009 | Fujii | .................... | G01N 21/718 |
| | | | | 356/318 |

OTHER PUBLICATIONS

Daigle, J.F., et al. "Remote sensing with intense filaments enhanced by adaptive optics." Applied Physics B 97, No. 3 (2009): 701-713.
Rohwetter, P., et al. "Laser-induced water condensation in air." Nature Photonics 4, No. 7 (2010): 451-456.
European Search Report issued on con-esponding European Patent Application No. 12884334.9 on May 9, 2016.
H. Wille et al., Teramobile: A mobile Femtosecond-Terawatt Laser and Detection System, European Physical Journal Applied Physics, vol. 20, 183-190 (2002).
W. Liu et al., "An efficient control of ultrashort laser filament location in air for the purpose of remote sensing," Applied Physics B, 85, 55 (2006).
J.-F. Daigle et al., "A simple method to significantly increase filaments' length and ionization density" Appl. Phys. B., 94, 249, (2009).
M. Rodriquez et al., "Kilometer-range non-linear propagation of fs laser pulses," Physical Review E 69, 036607 (2004).

* cited by examiner

TELESCOPIC CONTROL OF HIGH POWER LASER PROPAGATION

FIELD OF THE INVENTION

The present invention relates to high power laser propagation, and in particular to controlling the filamentation distance of ultrashort and intense laser pulses.

BACKGROUND OF THE INVENTION

During the past decade, the propagation of powerful laser pulses over long distances in air has attracted a lot of interest. In particular, the optical processes occurring during the propagation of these pulses in the atmosphere are of great interest. For instance, the propagation behavior of powerful and ultrashort laser pulses in air differs significantly from that of continuous wave or long pulse lasers. For ultrashort and intense laser pulses, numerous nonlinear optical effects are produced such as the Kerr self-focusing effect, the self-generation of plasma, and the spectral broadening effect due to self-phase modulation. Other novel laser properties may be found from ultrashort and intense laser pulses, such as self-collimated beams over long distance, spatial beam self-cleaning, and self-stabilization.

More than being of high scientific interest, the filamentation of ultrashort and intense laser pulse has a number of important applications. The propagation of these intense ultrashort laser pulses in the atmosphere can induce the ionization of air and create a conductive plasma channel along its path. Such a plasma channel can be used to guide other energy sources, such as microwave and high voltage energy sources. The plasma channel can also be used for counter-measures against improvised explosives devices, rockets and other similar threats. The use of laser pulse filamentation enables the scanning of a large area or the quick aim of the laser in the direction of a threat. Moreover, the filamentation of a laser pulse modifies its spectral distribution during the propagation and evolves into a continuous broadband (white-light) laser pulse. The broadband pulse can be used for broadband dazzling of optical devices—independently of the spectral range used by the optical detector of the threat.

The propagation of a high power laser beam into the atmosphere is characterized by numerous linear and nonlinear optical effects that influence the transportation of the laser power at long distances. A nonlinear optical effect, such as the Kerr self-focusing, or a linear optical effect, such as the atmospheric turbulence, can strongly decrease the achievable laser intensity at long distance. As such, reaching a high laser intensity at long range in the atmosphere with a compact optical device remains a challenge. Solutions for delivering the high laser intensity at long distances involve the use of optical components that correct the perturbations from the linear propagation effects and that modify the parameters of the laser beam to minimize the nonlinear intensity-dependent optical effects.

Many approaches exist to control the filamentation distance of ultrashort and intense laser pulse.

The use of a refractive telescope to expand the laser beam diameter is disclosed in the following reference: W. Liu, F. Theberge, J.-F. Daigle, P. T. Simard, S. M. Sarifi, Y. Kamali, H. L. Xu, S. L. Chin, "An efficient control of ultrashort laser filament location in air for the purpose of remote sensing," Applied Physics B, 85, 55 (2006). Here, a refractive beam expander is designed to control the filamentation distance of ultrashort and intense laser pulses. The generation of ultrashort and intense laser pulses at relatively long distances is done by increasing the radius of the beam and decreasing its peak power in such a way that the self-focusing distance $z_f$ is much longer than the effective focal length of the telescope $f_{eff}$.

Unfortunately, the refractive telescope method is only optimized for a single wavelength. Therefore, the pulse is subject to chromatic aberrations since the spectrum of ultrashort pulse is large (up to 10's of nm). Moreover, non-linear optical effects are more problematic in glass than in air, and the self-focusing within the refractive optics of the telescope tends to generate "hot spots" in the laser beam profile. These hot stops decrease the effective radius of the laser beam and cause the laser beam to self-focus at shorter distances. Another drawback with this prior art technique is that such refractive telescopes do not compensate for the aberrations from the laser beam itself and the perturbation from the atmospheric turbulences.

The following prior art reference discloses masking the edge of the laser beam with an iris: J.-F. Daigle, O. Kosareva, N. Panov, M. Bégin, F. Lessard, C. Marceau, Y. Kamali, G. Roy, V. P. Kandidov, S. L. Chin, "A simple method to significantly increase filaments' length and ionization density" Appl. Phys. B., 94, 249, (2009). The prior art reference teaches that by clipping the edge of a laser beam with the optimum aperture, it is possible to include multiple filaments around the propagation axis, thus forming a regularized and elongated filament structure with a higher overall amount of plasma.

One drawback of the clipping technique is that masking the edge of a laser beam with an iris may decrease the power of the laser beam. Unfortunately, the optimum iris diameter depends on the beam profile of the laser beam. Therefore, for real propagation in the atmosphere, the beam profile of the laser beam can strongly fluctuate due to the atmospheric turbulences, and it becomes impossible to determine an optimal iris diameter.

Another prior art reference discloses chirping the laser pulse to compensate for the dispersion of the atmosphere: M. Rodriguez, R. Bourayou, G. Méjean, J. Kasparian, J. Yu, E. Salmon, A. Sholz, B. Stecklum, J. Eislöffel, U. Laux, A. P. Hatzes, R. Sauerbrey, L. Wöste, J. P. Wolf, "Kilometer-range non-linear propagation of $f_s$ laser pulses," Physical Review E 69, 036607 (2004). By chirping the laser pulse (i.e., increasing its pulse duration) from the initial laser source, it is possible to decrease the peak power P of the laser pulse and pre-compensate for the dispersion from the atmosphere in order to control the self-focusing distance, i.e., control the range of filamentation. However, the self-focusing distance $z_f$ is proportional to the peak power P and the square of the beam radius a. Therefore, increasing the size of the beam is the most efficient way to increase the self-focusing distance, rather than only reducing the peak power. Any aberrations from the laser beam itself or any perturbations from the atmospheric turbulence are not compensated for by this prior art technique.

As suggested, the techniques utilized in the prior art are unsuitable or lack suitable efficiency for controlling the laser beam filamentation at long distances in the atmosphere.

SUMMARY OF INVENTION

The present invention provides a reflective telescopic system to control the generation of filamentation of ultrashort and intense laser pulses. The reflective telescope system includes: a flat mirror, an adaptive reflective mirror, a dichroic convex mirror, an off-axis parabolic mirror, and a first laser source. The propagation axis of the laser beam reflected by the mirror should correspond to the off-axis of the parabolic mirror. This off-axis has a specific angle with the beam reflected by the parabolic mirror. Finally, the propagation axis between the dichroic convex mirror and the off-axis parabolic mirror, the propagation axis between the flat mirror and the adaptive reflective mirror, and the axis of the translation stage should be substantially parallel to each other. These above conditions enable the control of the filamentation distance while preserving the pointing of the laser beam on the mirrors.

The present invention also contemplates the boresighting of a weak laser beam from a second laser source. The weak laser beam can be a visible laser or a laser detectable by an optical sensor. The propagation axis of the weak laser beam between the dichroic mirror and the parabolic mirror should be parallel to the parabola off-axis. Such alignment can be achieved by aligning the weak laser beam with the mirrors. When transmitting through the convex mirror, the weak laser beam will be focused by this last optic. In order to superpose the focus of the weak laser beam with the effective focus of the telescope, a diverging lens with the appropriate focal length is added before the weak beam passes through the dichroic mirror.

In a first aspect, the present invention provides a reflective telescopic system for propagating a first laser beam from a first laser source, comprising:
  a telescope having:
    an off-axis parabolic mirror for reflecting the first laser beam;
    a dichroic convex mirror for reflecting the first laser beam to the parabolic mirror;
    an adaptive reflective mirror to reflect the first laser beam to the dichroic convex mirror;
  and
  a first flat mirror, operatively positioned to reflect the first laser beam from the first laser source to the adaptive reflective mirror;
    wherein a first propagation axis of the first laser beam between the dichroic convex mirror and the off-axis parabolic mirror is substantially parallel with a second propagation axis between the first flat mirror and the adaptive reflective mirror.

In a second aspect, the present invention provides a method for controlling a filamentation distance of an ultrashort and intense laser pulse from a first laser beam, the method comprising:
  a) providing an off-axis parabolic mirror for reflecting the first laser beam;
  b) providing a dichroic convex mirror for reflecting the first laser beam to the parabolic mirror;
  c) providing an adaptive reflective mirror to reflect the first laser beam to the dichroic convex mirror;
  d) providing a first flat mirror, operatively positioned to reflect the first laser beam from the first laser source to the adaptive reflective mirror;
  e) adjusting a distance between the dichroic convex mirror and the off-axis parabolic mirror to control a convergence of the first laser beam as reflected by the off-axis parabolic mirror;
    wherein a first propagation axis of the first laser beam between the dichroic convex mirror and the off-axis parabolic mirror is substantially parallel with a second propagation axis between the first flat mirror and the adaptive reflective mirror.

In a third aspect, the present invention provides a reflective telescopic system for propagating a first laser beam from a first laser source, comprising:
  a telescope having:
    an off-axis parabolic mirror for reflecting the first laser beam;
    a dichroic convex mirror for reflecting the first laser beam to the parabolic mirror;
    an adaptive reflective mirror to reflect the first laser beam to the dichroic convex mirror;
  and
  a first flat mirror, operatively positioned to reflect the first laser beam from the first laser source to the adaptive reflective mirror;
  a diverging lens for superposing a focus of a second laser beam from a second laser source with an effective focus of the telescopic system, the diverging lens being positioned such that the second laser beam passes through the diverging lens before passing through the dichroic mirror;
    wherein a first propagation axis of the first laser beam between the dichroic convex mirror and the off-axis parabolic mirror is substantially parallel with a second propagation axis between the first flat mirror and the adaptive reflective mirror.

In a fourth aspect, the present invention provides a method for controlling a filamentation distance of an ultrashort and intense laser pulse from a first laser beam, the method comprising:
  a) providing an off-axis parabolic mirror for reflecting the first laser beam;
  b) providing a dichroic convex mirror for reflecting the first laser beam to the parabolic mirror;
  c) providing an adaptive reflective mirror to reflect the first laser beam to the dichroic convex mirror;
  d) providing a first flat mirror, operatively positioned to reflect the first laser beam from the first laser source to the adaptive reflective mirror;
  e) adjusting a distance between the dichroic convex mirror and the off-axis parabolic mirror to control a convergence of the first laser beam as reflected by the off-axis parabolic mirror;
  f) providing a diverging lens to superpose a focus of a second laser beam with an effective focus of an apparatus provided in steps a)-d);
    wherein a first propagation axis of the first laser beam between the dichroic convex mirror and the off-axis parabolic mirror is substantially parallel with a second propagation axis between the first flat mirror and the adaptive reflective mirror.

BRIEF DESCRIPTION OF THE DRAWINGS

The embodiments of the present invention will now be described by reference to the following figures, in which identical reference numerals in different figures indicate identical elements and in which.

Figure 1:
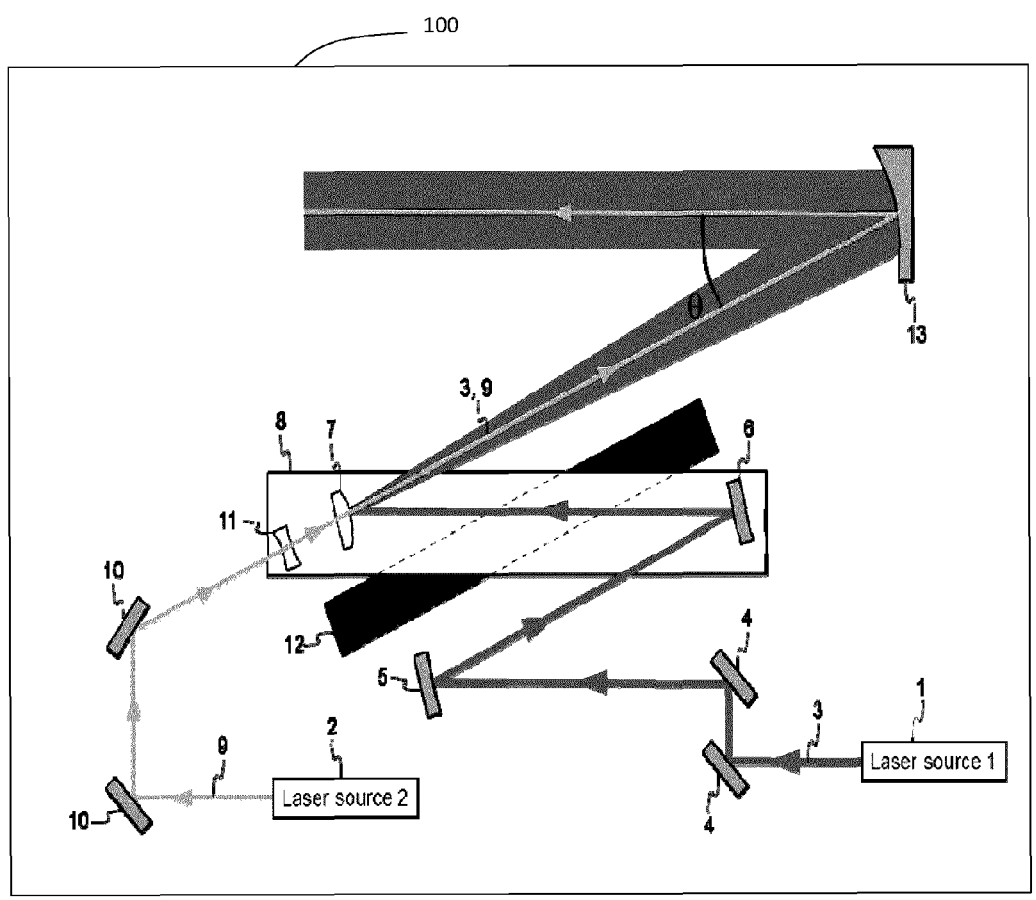
FIG. 1 illustrates a reflective telescopic system according to one embodiment of the present invention.

The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

The present invention provides a reflective telescopic system to control the generation of filamentation (i.e., filament propagation) of ultrashort and intense laser pulses. The present invention seeks to correct the linear perturbations from the atmosphere and from the laser beam itself with an adaptive mirror implemented in a telescope to control the magnification of the beam and its divergence/convergence. The magnification of the laser beam by the telescope contributes also to minimizing the nonlinear propagation effects over most of the propagation distance.

The present invention also contemplates providing adjustments to the peak power and chirp of the laser pulses emanating from the telescopic system to optimize the generation of filaments at longer distances.

The present invention utilizes a beam expander to induce filaments at long distance to take advantage of the self-focusing property of powerful and ultrashort laser pulses. The self-focusing distance $z_f$ of a laser pulse, which is also the starting point of the filament, is provided by the following equation:

$$z_f = \frac{0.367 k a^2}{\left\{\left[\left(\frac{P}{P_{cr}}\right)^{1/2} - 0.852\right]^2 - 0.0219\right\}^{1/2}}$$

where $P_{cr}$ is the critical power for self-focusing; k is the wave vector of the laser pulse; a is the beam radius defined at a 1/e level of the intensity; and P is the initial peak power of the laser pulse.

Thus, a laser beam having a larger radius a would tend to self-focus at a longer distance. Moreover, decreasing the ratio $P/P_{cr}$ (by adjusting the energy per pulse, the pulse duration and/or the laser chirp) would also increase the self-focusing distance $z_f$.

In the presence of the external focusing, the new self-focusing distance $z'_f$ may be determined by the following equation:

$$z'_f = \frac{z_f f_{eff}}{z_f + f_{eff}}$$

where $f_{eff}$ denotes the effective focal length of the telescope.

Thus, if we adjust the radius a of the beam and its peak power P such that $z_f \gg f_{eff}$, then $z'_f \cong f_{eff}$ and the filament is generated around the geometrical focus of the telescope.

Referring now to FIG. 1 of the Drawings, the present invention provides a reflective telescopic system 100 according to one embodiment of the present invention. In one embodiment, the reflective telescopic system 100 comprises a telescope having the following reflective optical components: a flat mirror 5, an adaptive reflective mirror 6, a dichroic convex mirror 7, and an off-axis parabolic mirror 13. The adaptive reflective mirror 6 and the dichroic convex mirror 7 are operatively coupled to an integrated circuitry (IC) breadboard 8. The breadboard 8 is operatively coupled to a translation stage 12. The reflective telescopic system 100 may be further operatively coupled to a first laser source 1 and a first set of two flat mirrors 4, which are operatively positioned relative to reflective telescopic system 100 and the first laser source 1. It should be noted that the breadboard and translation stage may be used in an experimental set-up to facilitate adjustments to the positioning of the various mirrors in the system. For a deployment set-up, fixed positioning of the adaptive reflective mirror 6 relative to the convex mirror 7 may be used while a movable or adjustable platform (in lieu of the translation stage) may be used to adjust the distance between the convex mirror 7 and the parabolic mirror 13.

For boresighting a second laser source, the reflective telescopic system 100 may be further operatively coupled to a second laser source 2, a second set of two flat mirrors 10, and a diverging lens 11. The diverging lens 11 may be operatively coupled to the breadboard 8.

For a collimated input beam, the magnification M and the effective focal length of the telescope $f_{eff}$ are given by the following equations:

$$M = |(d - f_7)/f_7|$$

and $$f_{eff} = [(1/f_{13}) - (1/(d - f_7))]^{-1}$$

where d is the distance between the convex mirror 7 and the off-axis parabolic mirror 13, and $f_7$ and $f_{13}$ are the respective focal lengths of these mirrors.

It should be mentioned that the convex mirror 7 cannot be replaced by a concave mirror, such as a Newtonian telescope, because tight focusing of an ultrashort and intense laser pulse in air will generate dense plasma that will diffract the laser beam itself and strongly deteriorate the spatial and temporal beam profiles.

It should further be noted that the term "focal length", when applied to the off-axis parabolic mirror, means the slant focal length of the off-axis parabola. The slant focal length of the off-axis parabola is the distance along the parabola off-axis between the optical surface of the off-axis parabola and the parent parabola's focus. It should also be noted that the propagation axis between the convex mirror 7 and the off-axis parabolic mirror does not have to pass through the mechanical center of the off-axis parabola. It should also be noted that the "off-axis" of the parabolic mirror is used to refer to a line between the optical surface of the off axis parabolic mirror and the focus of the parent parabola. This focus of the parent parabola is behind mirror 7.

To control the convergence of the telescope (or the effective focal length of the telescope $f_{eff}$), the distance d (between the convex mirror 7 and the off-axis parabolic mirror 13) is modified while keeping the laser beam centered on the convex mirror 7 and collinear with the off-axis of the parabolic mirror 13 in order to minimize any aberration and maintain the pointing of the laser beam. To achieve such conditions, the convex mirror 7 and the mirror 6 are operatively fixed on the breadboard 8, which is operatively set on the translation stage 12. The propagation axis of the laser beam reflected by the mirror 7 should correspond to the off-axis of the parabolic mirror 13. As shown in FIG. 1, this off-axis has an angle θ with the beam reflected by the parabola. The propagation axis between the mirrors 7 and 13, the propagation axis between the mirrors 5 and 6, and the longitudinal axis of the translation stage 12 should also be substantially parallel. By achieving the above-noted conditions, the filamentation distance may be controlled while preserving the pointing of the laser beam and minimizing the aberrations. Again, the breadboard and the translation stage may be used in an experimental set-up while a more permanent mounting may be used in a deployment set-up. Of course, for such a set-up, the axis of movability (i.e. the axis of motion when the distance d between mirrors 7 and 13) is parallel to the axis of propagation between mirrors 7 and 13.

It should be clear that the propagation axis between mirror 7 and off-axis parabolic mirror 13 is collinear with and superposed on the off-axis of the parabolic mirror 13.

Regarding the angle θ, depending of the desired laser magnification and the diameters of the optics used, a large enough angle θ must be selected to avoid clipping the mirror 7 with the reflected laser beam from the parabola mirror 13. If the θ is selected, the aberrations generated by tilting the mirror 7 by an angle θ will also increase.

The present invention further provides that where the pointing of the powerful laser beam 3 emanating from the first laser source 1 changes, the two mirrors 4 may assist in re-centering the laser beam on the following mirrors 5, 6, 7, and 13. In a deployment set-up, the two mirrors 4 may be replaced by any number of mirrors which can be used to re-center the primary or first laser beam on the adaptive reflective mirror 6, the dichroic convex mirror 7, and the off-axis parabolic mirror 13. In some embodiments, mirror 4 is movable while mirrors 5, 6, 7, and 13 are fixed. In other implementations, these mirrors can be movable for greater flexibility in aligning the laser beam.

Usually, the central wavelength of an ultrashort and intense laser beam is not visible. For safety reasons, it is important to know where the telescope is pointing the powerful laser beam. Therefore, a further embodiment of the present invention contemplates boresighting a weak laser beam 9 from the laser source 2. The laser beam 9 can be a visible laser or a laser detectable by an optical sensor. The propagation axis of the weak laser beam between the dichroic mirror 7 and the parabolic mirror 13 should be parallel to the parabola off-axis. Such alignment can be achieved by aligning the weak laser beam 9 with the flat mirrors 10. Accordingly, the dichroic convex mirror 7 transmits the weak laser beam 9 and reflects the powerful laser beam 3. When transmitting through the dichroic convex mirror 7, the weak laser beam 9 will be focused by this last optic. In order to superpose the focus of the weak laser beam 9 with the effective focal length ($f_{eff}$) of the telescope, a diverging lens 11 with the appropriate focal length is added before the weak laser beam 9 passes through the dichroic convex mirror 7.

During the propagation of powerful laser beams at long distance, the aberrations can strongly decrease the laser intensity. These aberrations can originate from the first laser source 1 itself, from the telescope's optics and/or the turbulence in the air. Any aberrations from the laser source and the telescope are generally constant in time and are substantially, if not fully, corrected with the adaptive reflective mirror 6 following the measurement of the laser wavefront at the output of the telescope.

Any turbulences in the atmosphere will fluctuate in time and along the propagation axis of the laser beam. Therefore, some real time corrections of the aberration must be performed. One way is to use the scattering generated at long distance from the weak laser beam 9 as a reference point source. Positioned next to the telescope, an optical sensor (not shown) can image this reference point source and retrieve the aberrations induced into the laser beam during its propagation. The information obtained from the optical sensor is then used to compensate for the turbulences with the adaptive reflective mirror 6 and thus optimize the laser intensity at long range. Accordingly, the adaptive reflective mirror 6 may be positioned either in its current position or at the current position of the flat mirror 5. In the event the turbulences and aberrations are not important enough for the filamentation of the ultrashort and intense laser beam, the adaptive reflective mirror 6 may be replaced by a flat mirror.

Figure 2:
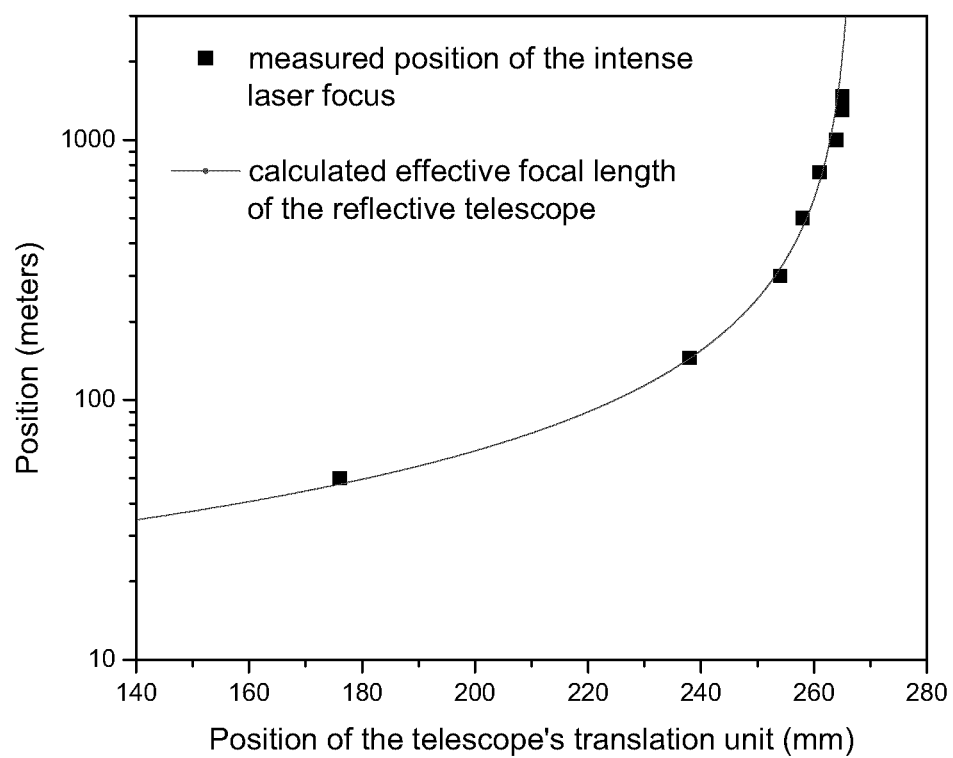
FIG. 2 is a graphical representation of the position of the ultrashort and intense laser beam focus in the atmosphere according to another embodiment of the present invention.

FIG. 2 is a graphical representation of the position of the ultrashort and intense laser beam focus in the atmosphere according to another embodiment of the present invention. The squares denote the measured position of the intense laser focus. The line denotes the calculated effective focal length of the reflective telescope.

Research has shown that the use of filamenting laser pulses enables the scanning of a large area or the quick aiming of the laser in the direction of a threat. Moreover, a filamenting laser pulse would modify its spectral distribution during the propagation and would evolve into a continuous broadband (white-light) laser pulse that can be used for broadband dazzling of optical devices—independently of the spectral range used by the optical detector of the threat.

In addition to the above, intense ultrashort laser pulses may be used for other uses. The propagation of these femtosecond laser pulses in the atmosphere can induce the ionization of the air and thereby create a conductive plasma channel along its path. Such a plasma channel can be used to guide other energy sources such as microwave and high voltage energy as countermeasures against improvised explosive devices, rockets, and other similar threats.

The reflective telescope of the present invention has been used to generate km-range filament during a field trial. During the field trial, the telescope was able to control the position of the filaments over long distance in turbulent atmosphere. FIG. 2 shows the calculated position of the telescope focus and the measured position of the intense and ultrashort laser beam focus.

The reflective telescope system of the present invention is advantageous in that it is a low cost optical system.

The present invention also contemplates many different applications, including but not limited to military and security applications. The telescope of the present invention is particularly advantageous for the remote sensing of atmospheric pollutants and for countermeasure applications based on high power laser beams. For example, the reflective telescope of the present invention could also be used for monitoring industrial pollutants through a LIDAR (Light Detection And Ranging) scheme. Another application includes feeding energy to a remote piloted vehicle that could fly forever above a site for surveillance purposes.

A person understanding this invention may now conceive of alternative structures and embodiments or variations of the above all of which are intended to fall within the scope of the invention as defined in the claims that follow.

What is claimed is:

1. A reflective telescopic system for propagating a first laser beam from a first laser source, comprising:
a telescope having:
an off-axis parabolic mirror for reflecting the first laser beam;
a dichroic convex mirror for reflecting the first laser beam to the parabolic mirror;
an adaptive reflective mirror to reflect the first laser beam to the dichroic convex mirror; and
a first flat mirror, operatively positioned to reflect the first laser beam from the first laser source to the adaptive reflective mirror;
a diverging lens for superposing a focus of a second laser beam from a second laser source with an effective focus of the telescopic system, the diverging lens being positioned such that the second laser beam passes through the diverging lens before passing through the dichroic mirror;
wherein a first propagation axis of the first laser beam between the dichroic convex mirror and the off-axis parabolic mirror is substantially parallel with a second propagation axis between the first flat mirror and the adaptive reflective mirror.

2. The reflective telescopic system as in claim 1, further including a second flat mirror and a third flat mirror, operatively positioned for optimally centering the first laser beam on the first flat mirror, the adaptive reflective mirror, the convex dichroic mirror, and the parabolic mirror.

3. The reflective telescopic system as in claim 1, further including a fourth flat mirror and a fifth flat mirror for superposing the focus of the second laser beam with the effective focus of the reflective telescope system.

4. The reflective telescopic system as in claim 3, wherein the second laser beam is a visible laser.

5. The reflective telescopic system as in claim 3, wherein the second laser beam is a laser beam detectable by an optical sensor.

6. The reflective telescopic system as in claim 1, wherein a starting point of a filament $z_f$ is defined by the following equation:

$$z_f = \frac{0.367ka^2}{\left\{\left[\left(\frac{P}{P_{cr}}\right)^{1/2} - 0.852\right]^2 - 0.0219\right\}^{1/2}}$$

where $P_{cr}$ is the critical power for self-focusing;
k is the wave vector of a laser pulse;
a is the beam radius defined at 1/e level of intensity; and,
P is the initial peak power of the laser pulse
and wherein adjusting the initial peak power and a chirp of the laser pulse emanating from the telescope to decrease the ratio $P/P_{cr}$ optimizes the generation of filaments over distances.

7. The reflected telescopic system as in claim 1, wherein a distance between the dichroic convex mirror and the off-axis parabolic mirror is adjustable.

8. A method for controlling a filamentation distance of an ultrashort and intense laser pulse from a first laser beam, the method comprising:
a) providing an off-axis parabolic mirror for reflecting the first laser beam;
b) providing a dichroic convex mirror for reflecting the first laser beam to the parabolic mirror;
c) providing an adaptive reflective mirror to reflect the first laser beam to the dichroic convex mirror;
d) providing a first flat mirror, operatively positioned to reflect the first laser beam from the first laser source to the adaptive reflective mirror;
e) adjusting a distance between the dichroic convex mirror and the off-axis parabolic mirror to control a convergence of the first laser beam as reflected by the off-axis parabolic mirror;
f) providing a diverging lens to superpose a focus of a second laser beam with an effective focus of an apparatus provided in steps a)-d);
wherein a first propagation axis of the first laser beam between the dichroic convex mirror and the off-axis parabolic mirror is substantially parallel with a second propagation axis between the first flat mirror and the adaptive reflective mirror.

9. The method according to claim 8 further including the step of:
positioning the focus of the second laser beam to superpose the focus of the second laser beam with the effective focus of the apparatus provided in steps a)-d).

10. The method according to claim 9 wherein the second laser beam passes through the diverging lens before passing through the dichroic mirror.

* * * * *